United States Patent Office 3,444,029
Patented May 13, 1969

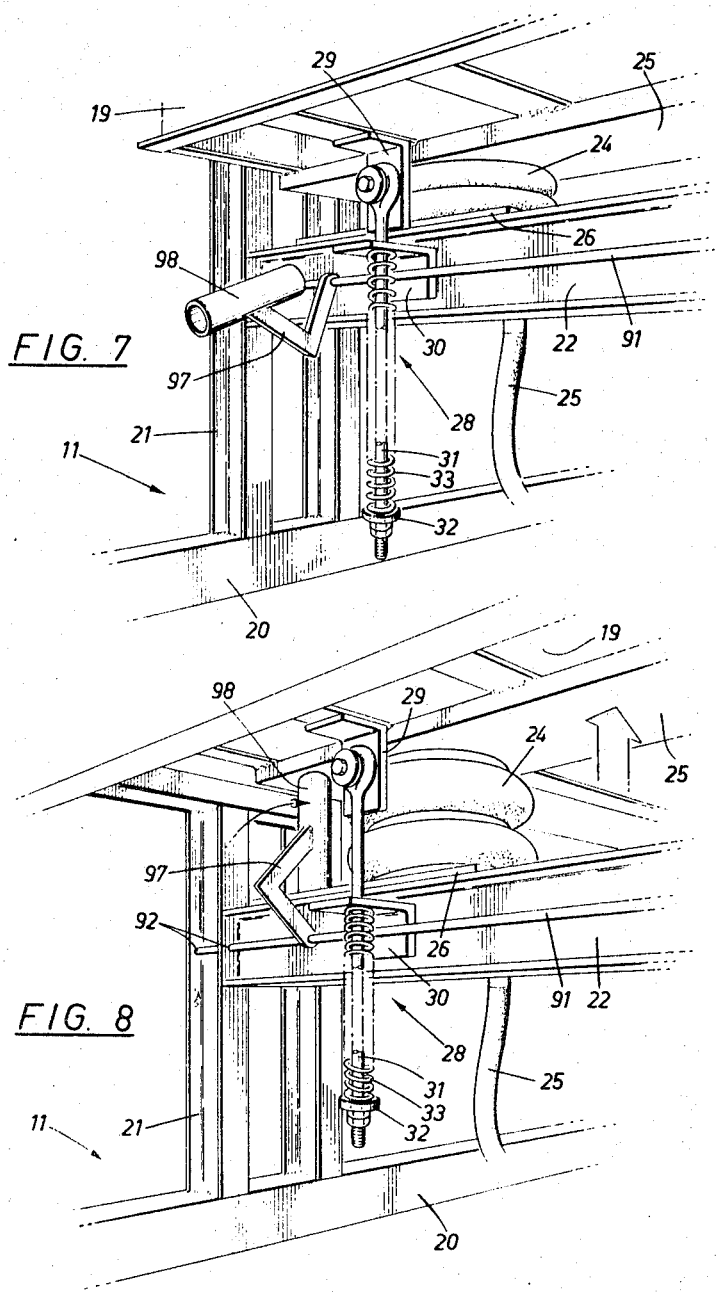

1

3,444,029
WOOD PANEL PRESS
Edward H. Renaud, Waterloo, Ontario, and William W. R. Gilpin, Kitchener, Ontario, Canada, assignors, by mesne assignments, to Radyne Ltd., Workingham, England
Filed Mar. 16, 1966, Ser. No. 534,706
Int. Cl. B30b 7/04
U.S. Cl. 156—380    9 Claims This invention relates to presses for use in the manufacture of composite panels which comprise a plurality of elongated components aligned in side-by-side relation and glued or adhered together at the inter-component edges. More particularly, the press to which this invention is directed is adapted to exert edge-wise transverse pressure on the panel components in order to compress the inter-component edges together, and at the same time to exert pressure in a direction perpendicular to the finished panel, in order to prevent the panel components from buckling under the influence of the first transverse pressure.

Presses for this purpose presently in use generally consist of a frame upon which an upper platen and a lower platen are horizontally mounted. The lower platen is fixed at a given vertical location with respect to the frame, and the frame has an opening at one side adjacent and flush with the upper surface of the lower platen. A lay-up table attached exteriorly to the frame is adapted to deliver elongated panel components aligned in side-by-side relation transversely through the opening and onto the lower platen. The panel components have adhesive material at the inter-component edges. Once the components have been introduced onto the lower platen, the upper platen is caused to descend and vertically compress the panel components against the lower platen. While the panel components are thus held against vertical buckling, further pressure means enters the inter-platen space and compresses the panel components horizontally in a transverse direction in order to force the inter-component edges against one another. While these edges are under compression, the adhesive material along the inter-component edges is made to set, thereby forming a composite panel. The frame is provided with horizontally displaceable arm means which, after the transverse pressure has been relieved and the upper platen has been withdrawn, sweeps across between the platens in a direction parallel with the elongated panel components to clear the formed panel from between the platens in a direction at right angles to the direction from which the panels were introduced between the platens. After having swept across the inter-platen face, the arm means withdraws again to its starting point closely adjacent the platen but outside the path of movement of the upper platen.

The press is then ready for a further panel-forming operation.

The adhesive material at the inter-component edges usually incorporates an uncured plastic resin adapted to be cured by reason of the generation of heat within the resin due to the setting up of an electric field therewithin. The electric field is created by electrical apparatus in at least one of the platens.

The above-described press has two particular disadvantages which this invention aims at overcoming.

Firstly, the upper, "withdrawn" position of the upper platen is fixed, and this is disadvantageous from the point of view of the work done each time the upper platen is caused to descend. The upper platen is usually biased towards its uppermost, "withdrawn" position by means of coil springs either above or below the platen. In order to cause the platen to descend, means must be provided to push downwardly against the force of the springs, and the total work done per descent will be equal to $$W = D\left[\frac{F_1 + F_2}{2}\right]$$

where:

W = the total work done,
D = the total distance travelled,
$F_1$ = the force that must be overcome at the beginning of the descent, and
$F_2$ = the force that must be overcome at the end of the descent.

This formula assumes that the resistance of the springs increases linearly with the distance through which they are displaced.

It will be clear from the above formula that, where spring resistance increases linearly with spring displacement, the work done in the first part of the descent is always less than the work done in the last part of the descent, and that where $F_1 = 0$, the work done in the first half of the descent is only one third of the work done in the last half.

In prior art presses, the travel of the upper platen is usually about 7″, and pressurized air is used to cause the upper platen to descend. With a full travel of 7″ and $F_1 = 0$, the work expended merely to get the upper platen down to a point where it can begin to press against panel components whose vertical dimension is 1″ is four times as great as the work expended to get the upper platen down to where it touches panel components whose vertical dimension is 4″, since it takes three times as much work to get from the 4″ level to the 1″ level as it does to get from the 7″ level to the 4″ level.

This problem of inefficiency might be solved if it were possible to adjust the "fixed" position of the lower platen upwardly or downwardly in accordance with the thickness of the panel components to be compressed. However, this kind of adjustability for the lower platen is ruled out due to the necessity of providing a lay-up table adjacent the frame which is adapted to feed the panel components into the inter-platen space. The lay-up table is cumbersome and has to be secured to the frame, and naturally the lower platen must remain flush with the lay-up table in order that the panel components may be slid from the latter to the frame.

The second disadvantage of the prior art press decribed above is related to its inability to function both as an "end-loader" and as a "side-loader," without considerable work and alteration being done. The expression "side-loader" refers to the fact that the panel components introduced between the platens from the lay-up table travel into the space between the platens in a direction transverse to their length, i.e. "sideways." It is also possible, however, to employ these presses as "end-loaders" wherein panel components of considerable length, sometimes even longer than the largest dimension of the press, are fed longitudinally into the machine in a direction perpendicular to the feed direction for side loading. The panel components are fed through the machine in a stepwise manner, stopping at regular intervals so that sequential sections of the ultimate panel can be compressed and adhered together. The difficulty presented by the prior art press in its conversion to "end-loading" has to do with the fact that the arm means mentioned above, which sweeps through the inter-platen space to clear the latter of formed panels, always squarely blocks off the inter-platen space because it is situated just above the surface of the lower platen and is generally elongated in the direction of side-load feeding. Thus, if end-loading were attempted, the panel components would abut against the arm means and be prevented from passing through the inter-platen space.

It is possible to overcome this second disadvantage of the prior art press by taking the trouble to disassemble the arm means, or by constructing it in a complicated way which would permit it to pivot or hinge out of the way for end-loading. The first of these remedies, however, is time-consuming, and the second is expensive.

It is an object of this invention to overcome the first of the above disadvantages.

It is furthermore an object of a preferred embodiment of this invention to overcome both of the above disadvantages.

The invention generally involves making the upper platen the fixed platen, although with means for adjusting the vertical locations at which it is "fixed," and making the lower platen the movable or reciprocating platen. The lower platen has a lower rest position wherein it is aligned with a lay-up table. The upper platen is then adjusted vertically upwardly or downwardly according to the vertical thickness of the panel components to be compressed. In the preferred embodiment, jack means are provided for insertion between the frame and the lower platen, in order to raise the latter clear of the arm means for end loading. The adjustability of the upper platen is great enough to accommodate any normal thickness of panel components, regardless of whether or not the jack means is in use.

More specifically, there is provided according to this invention a press for laterally compressing together elongated panel components, the press comprising a frame, a generally horizontal upper platen mounted on the frame and capable of being adjusted to and fixed at different vertical locations with respect to the frame, and a lower platen parallel with the upper platen and vertically movable upwardly toward and downwardly away from the upper platen. Feed means are provided, adapted to introduce panel components between said platens along a substantially horizontal plane which is fixed with respect to the frame. The lower platen is adapted to rest, during the introduction of panel components between the platens, at a vertical location wherein it is substantially aligned with said plane, in which condition the platens are open. There is further provided first means for selectively exerting an upward force upon the lower platen for selectively displacing the latter from said vertical location upwardly toward the upper platen to close the platens, thereby vertically to compress between the platens panel components introduced therebetween, and second means for selectively horizontally compressing together panel components that are between the closed platens.

One embodiment of this invention is illustrated in the accompanying drawings, in which like numerals refer to like parts throughout the several views, and in which:

FIGURE 7 is a perspective view of a part of the press shown in FIGURE 1, as seen from a point at the lower right-hand corner of the FIGURE 1 sheet; and FIGURE 8 is a similar perspective view of the same portion of the FIGURE 1 press, at a different stage in the operation.

Figure 1:
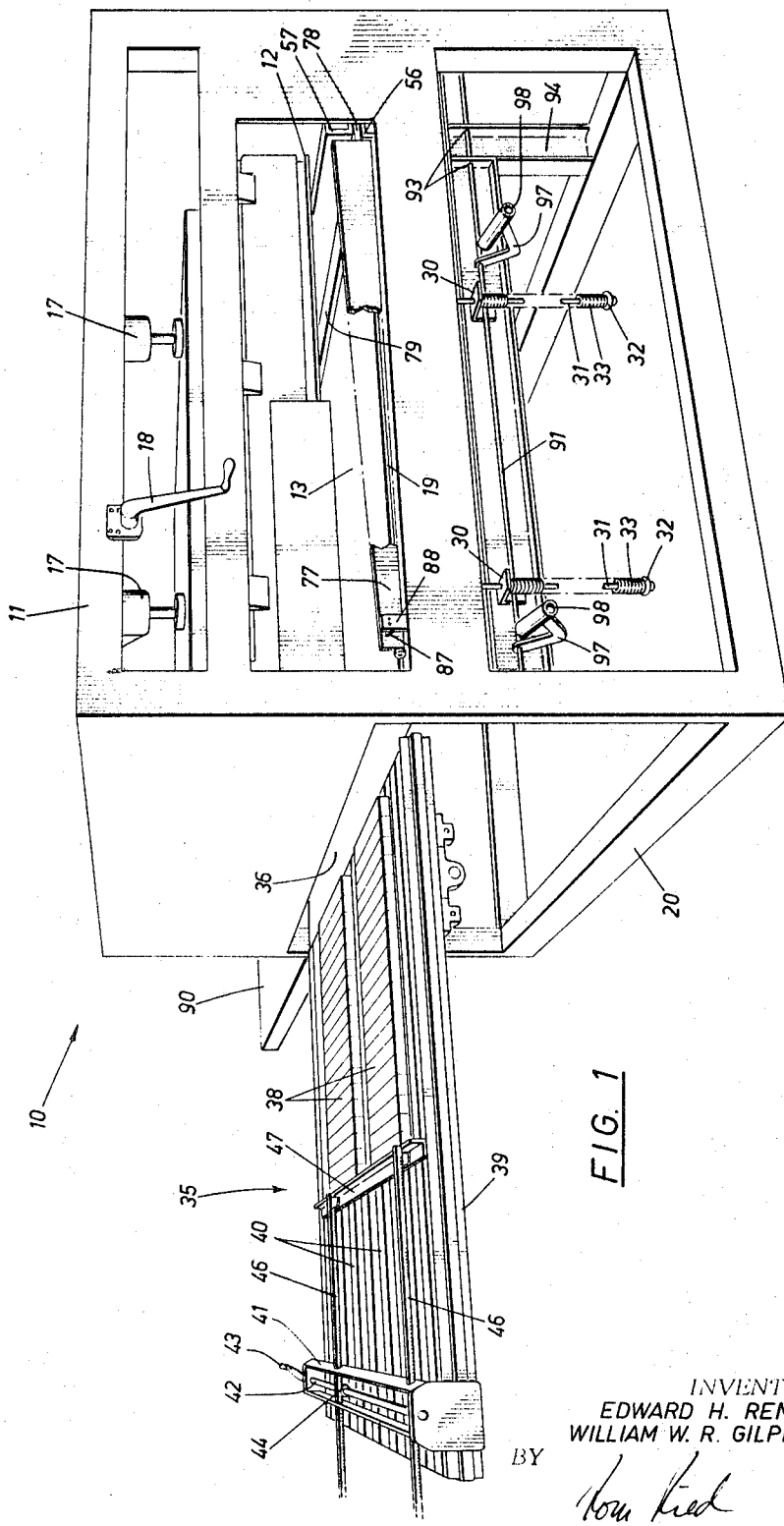
FIGURE 1 is a general perspective view of the entire press, including the lay-up table.
Figure 2:
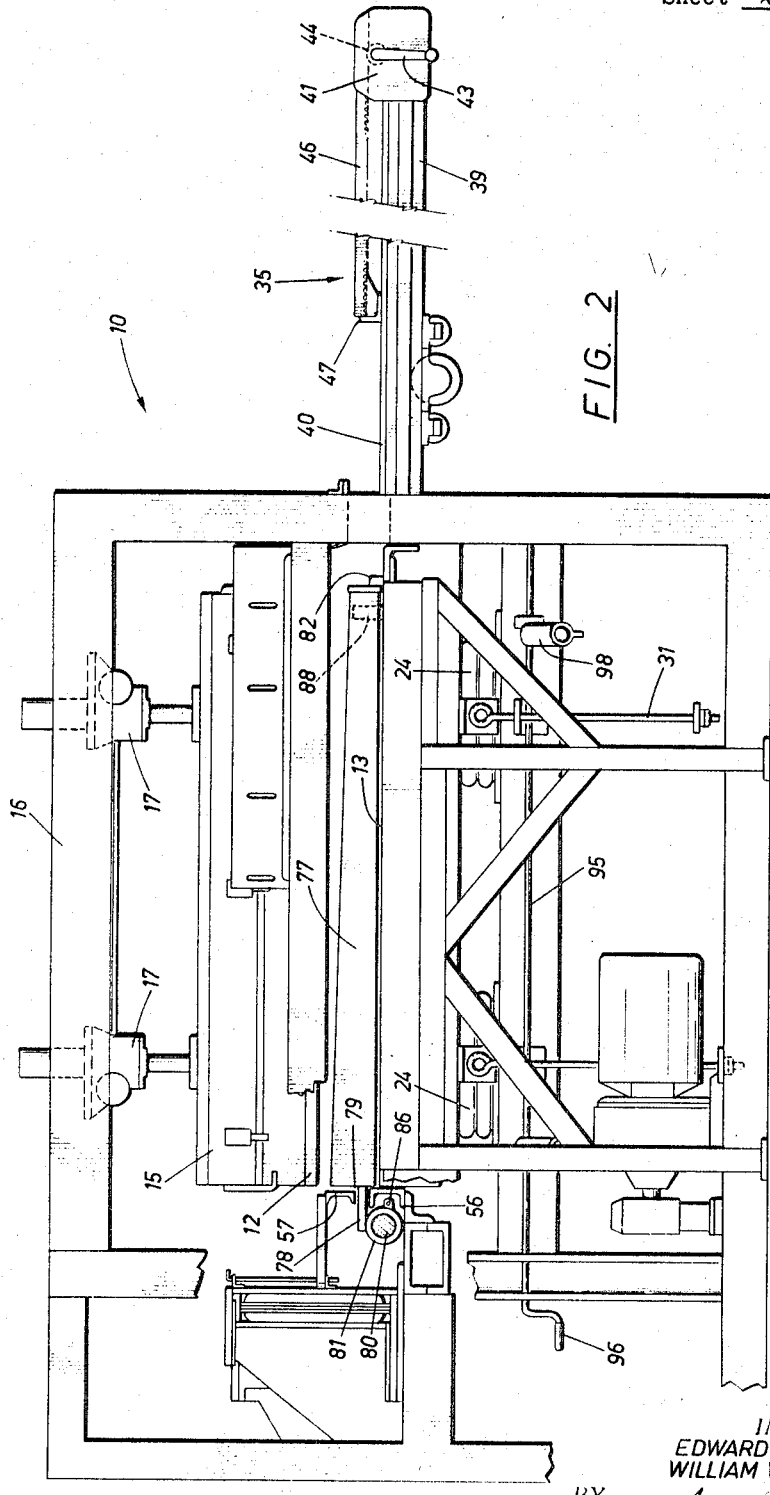
FIGURE 2 is an elevational view of the press and lay-up table as seen from the far side in FIGURE 1.

In FIGURE 1, a press 10 to which this invention is directed is seen generally to comprise a frame 11 in the form of a rectangular parallelepiped, within which are mounted a generally horizontal upper platen 12 and a lower platen 13 parallel with the upper platen 12. As shown in FIGURE 2, the upper platen 12 is mounted beneath a rectangular framework 15 which is adjustably suspended from upper members 16 of the frame 11 by means of four interconnected rack-and-pinion gear mechanisms 17. The gear mechanisms 17 are well-known in the art and need not be described in further detail. They are simultaneously controlled in the usual way from a single crank handle 18, shown in FIGURE 1. It is thus clear that, by means of the handle 18 and the gear mechanisms 17, the upper platen 12 is capable of being adjusted to and fixed at different vertical locations with respect to the frame. The lower platen 13 is vertically movable upwardly toward and downwardly away from the upper platen 12, and means are provided for selectively exerting an upward force upon the lower platen 13 for selectively displacing the latter upwardly toward the upper platen 12 to close the platens. The means by which the lower platen 13 is displaced is best seen in FIGURES 7 and 8. Both of these figures are views looking in underneath a structure 19 which supports the lower platen 13 (see also FIG. 1). A lower horizontal member 20 of the press frame 11 supports a vertical member 21, which in turn supports one end of a horizontal member 22, and the means by which the structure 19, and thus the lower platen 13, is raised and lowered is mounted directly on the horizontal member 22. The principal component of the raising and lowering means is a two-convolute air bag 24, which is both fed and exhausted by means of a pressurized air feed line 25. Four air bags 24 are provided for the structure 19, one in each corner, although only one is pictured in FIGURES 7 and 8. Air bags 24 are well known in this art, and it will be sufficient here to point out that they are adapted to distend axially upon the admission of air under pressure, and to collapse axially upon the exhaustion of air therefrom. The air bags are generally available with two convolutions and three convolutions, depending on the travel required. FIGURE 7 shows the air bag 24 collapsed, and FIGURE 8 shows the air bag distended to raise the structure 19. The air bag 24 bears upwardly against a flat, horizontal plate 26, secured to the horizontal member 22.

Four balancing mechanisms 28 are provided, one adjacent each air bag 24, to ensure that the structure 19 and the lower platen 13 remain generally horizontal during displacement. A vertically extending bracket 29 is secured to the structure 19, and a horizontally extending bracket 30 is secured to the horizontal member 22. A rod 31 is pivotally secured to the bracket 29, and extends downwardly through an aperture in the bracket 30. A washer 32 is secured to the lower end of the rod 31, and a coil compression spring 33 encloses the rod 31 between the rod 32 and the horizontal bracket 30. As the air bag 24 distends axially to displace the structure 19 upwardly, the coil spring 33 is compressed. If air is delivered to the four air bags 24 at the same pressure from a common reservoir, the mechanisms 28 will ensure that the air bags 24 all expand at a uniform rate, and that the structure 19 will remain substantially horizontal during displacement. Although the coil springs 33 will exert a downward force on the lower platen 13 which increases linearly with the displacement, the force they exert is negligible compared with the weight of the platen 13 and the structure 19, so that the disadvantage encountered in the prior art press, that of having to exert an increasing pressure to lower the upper platen, will not occur. To all intents and purposes, the weight lifted by the air bags 24 remains constant (until, of course, the panel components contact the upper platen 12).

A lay-up table 35, shown in FIGURES 1 and 2, is fixed to the frame 10 about midway of its height, and extends horizontally outwardly therefrom. A horizontally elongated aperture 36 is provided in the frame, and its lower edge is flush with the upper surface of the lay-up table 35. The lay-up table constitutes feed means for introducing panel components between the platens 12 and 13 along a horizontal plane. This press is particularly adapted to the production of wooden composite panels from a number of elongated wooden boards 38 which, prior to introduction between the platens 12 and 13, are aligned on the lay-up table 35 in parallel, side-by-side relationship transverse to their direction of introduction. The lay-up table 35 comprises an outer framework 39, supporting a plurality of inner runner members 40 parallel to the direction of introduction of wood panel components between the platens 12 and 13. A journal box 41 is mounted on the exterior framework 39 remotely of the frame 11, and a shaft 42 transverse to the runner members 40 is journalled therein. The shaft 42 has a crank handle 43 at one end, and two pinions 44 (only one of which is visible in FIGURE 1) are secured thereto at spaced intervals along its length. Two push rods 46 are secured at one end to a transverse pusher bar 47, and are slidably mounted in aligned apertures in the journal box 41 to slide therethrough in parallel relation. Each of the push rods 46 has a rack profile on its underside adapted to mesh with one of the pinions 44, such that by cranking the handle 43, the pusher bar 47 can be displaced toward and away from the frame 11 of the press 10. The lay-up table 35 has support members (not shown) at its edge remote from the frame 11.

As best shown in FIGURE 2, when the air bags 24 are completely collapsed, the lower platen 13 rests at a vertical location wherein it is substantially aligned with the horizontal plane of the lay-up table 35. It is in this vertical position that the lower platen 13 remains during the introduction of wooden panel components between the platens 12 and 13. The platens will be referred to as "open" when the lower platen 13 is in the vertical location wherein it is aligned with the lay-up table 35.

Figure 3:
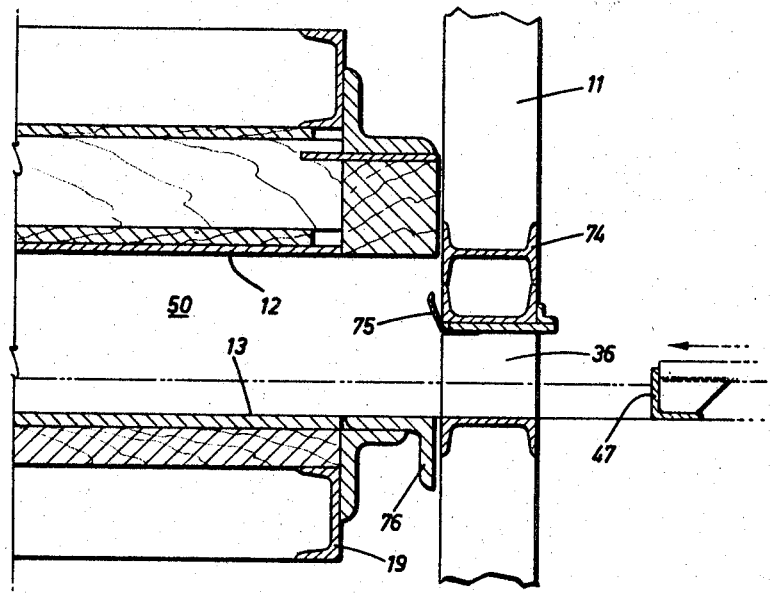
FIGURE 3 is a larger-scale vertical sectional view of a part of FIGURE 2 at one stage of a pressing operation.
Figure 4:
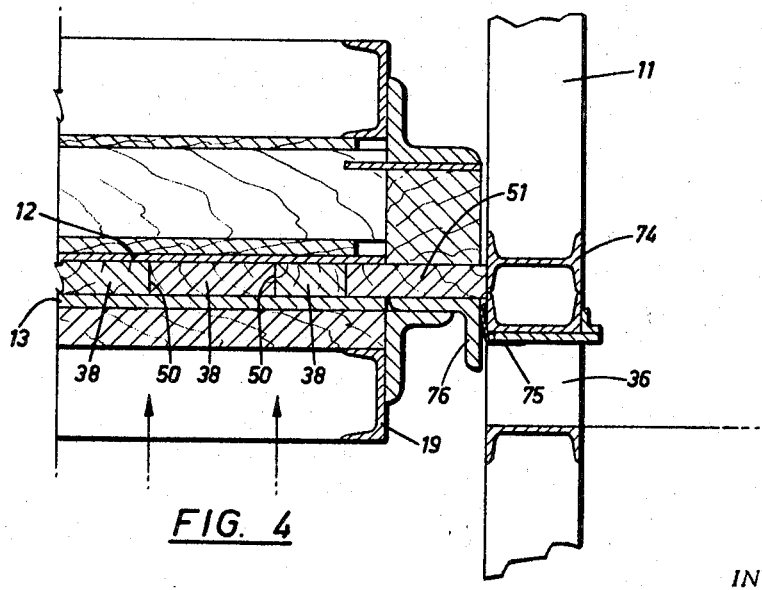
FIGURE 4 is a vertical sectional view, similar to FIGURE 3, of the same part at a different stage of a pressing operation.

The vertical compression of the wooden panel components is clearly shown in FIGURES 3 and 4. In FIGURE 3 the platens 12 and 13 are in the open position, with the lower platen 12 aligned with the horizontally elongated aperture 36 in the frame 11. When the platens are in this open position, the pusher bar 47 can introduce panel components into the inter-platen space 50. The panel components 38 have adhesive material applied at the inter-component edges, of which two are shown in FIGURE 4 at 50. The member 51 is merely a spacer member, the purpose of which will be described later. The adhesive material incorporates an uncured plastic resin which is adapted to be at least partially cured between and by means of the platens 12 and 13. This feature will be well known to those familiar with the art, and need not be described in detail. The resin containing adhesive material is usually applied to the panel components before they are aligned on the lay-up table 35. When the panel components have been introduced between the open platens, the latter are closed by means of the air bags 24. It is contemplated that the travel of the lower platen will always be approximately the same length, regardless of the vertical thickness of the panel components. This is possible because of the vertical adjustability of the upper platen 12. The fact that the travel of the lower platen does not vary appreciably permits the use of two-convolute air bags 24, instead of the three-convolute air bags generally employed in the prior art press described at the beginning of this specification.

Figure 5:
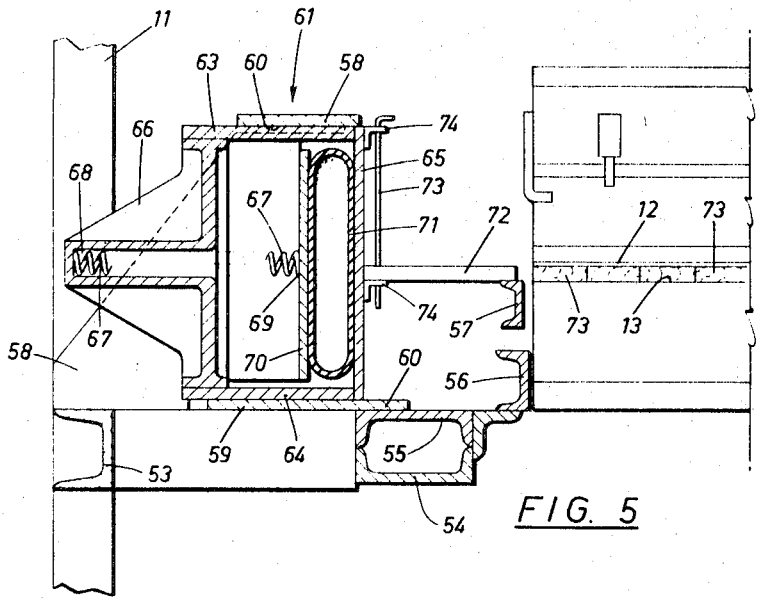
FIGURE 5 is a larger-scale vertical sectional view of a second part of FIGURE 2 at one stage of a pressing operation.
Figure 6:
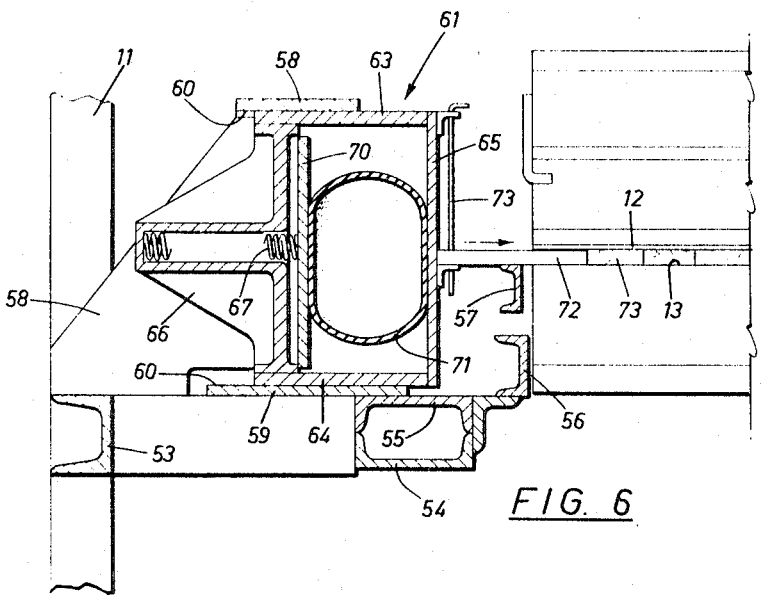
FIGURE 6 is a vertical sectional view, similar to FIGURE 5, of the same part at another stage of the pressing operation.

Before the resin in the adhesive material is cured, lateral or transverse pressure must be applied to the panel components 38 in order to compress the inter-component edges together. In FIGURES 3 and 4 this pressure will be left-right in the plane of the drawing sheet. The means by which this pressure is applied is best shown in FIGURES 5 and 6. Again, the construction of this part of the wood panel press is well known in the art and a brief description will suffice. Structural members 53, 54, 55, 56, 57, 58 and 59 are all secured in fixed relation to the frame 11. The members 58 and 59 define between them a parallel-walled slideway 60, in which a plurality of reciprocating structures, of which one is shown as 61 in cross-section in FIGURES 5 and 6, are aligned in side-by-side relationship in the direction perpendicular to the drawing sheet for FIGURES 5 and 6. Each of the reciprocating structures 61 includes a top member 63, a bottom member 64, a vertical member 65, and a spring-carrying member 66. Each of the structures 61 has a coil spring 67 partially contained within the spring-carrying members 66, and adapted to bear at one end 68 against the spring-carrying member 66, and at the other end 69 against a plate 70 which is fixed with respect to the frame 11. The single plate 70 extends perpendicularly to the drawing sheet through all of the adjacent structures 61. Between the plate 70 and the plurality of vertical members 65 is a single rubber tube 71 which is flexible but non-extensible, and which runs through all of the structures 61. The admission of air under pressure to the tube 71 results in the configuration shown in FIGURE 6, wherein the structure 61 has moved to the right, compressing the coil springs 67. Upon exhaustion of the air from the tube 71, the springs 67 will return the structures 61 to their extreme leftward position shown in FIGURE 5. To each of the structures 61 is secured a pusher block 72, which has a borehole near its left-hand end for receiving a key-rod 73 dropped between two apertured brackets 74 attached to the vertical members 65. The right-hand end of the blocks 72, which are preferably made of wood, slide on top of the structural member 57, the latter being positioned such that when the platens 12 and 13 are in their closed position, the lower platen 13 is located just below the upper edge of the member 57, and the blocks 72 are able to enter into the space between the platens. It is contemplated to vary the thickness of the blocks 72 in accordance with the thickness of the panel components being compressed.

When air under pressure is admitted to the rubber tube 71, each reciprocating structure 61 pushes its respective block 72 into the inter-platen space, all of the blocks 72 of course entering the inter-platen space simultaneously. The blocks 72 engage the furthest leftward panel component 73 along the entire length of the latter and shove it to the right. All of the panel components 38 are thereby compressed laterally and are forced against the spacer member 51 (FIG. 4) which abuts against a horizontal structural member 74 of the frame 11.

The uncured plastic resin in the adhesive material between the panel components is of the heat-curable kind, and one or both of the platens is provided with electrical apparatus for generating heat in the uncured plastic resin in order to cause it to set and to bond the panel components together. In the embodiment shown, the upper platen 12 is the "hot" platen while the lower platen 13 is the "ground" platen. The upper platen 12 is the generator of a high frequency electrical field within the inter-platen space, and this field tends to concentrate in the adhesive material at the inter-component edges. This creates heat in the adhesive material, and causes the plastic resin to be cured. A horizontally elongated flexible strip 75 of an electrically conductive metal material is secured in electrically conductive communication with a grounded part of the frame 11, and is adapted to be contacted by a member 76 attached to the structure 19 and in electrically conductive communication with the lower platen 13, whenever the latter is raised to compress panel components vertically, thereby to ground the lower platen 13.

The sequence followed during the pressing and curing operations is preferably as follows. After the wooden panel components 38 have been introduced into the inter-platen space 50 from the lay-up table 35, pressurized air is admitted to the air bags 24, which distend and displace the lower platen 13 upwardly to compress the panel components 38 between the two platens. Then, pressurized air is admitted to the tube 71, which expands and causes the pusher blocks 72 to enter the inter-platen space 50 and engage the furthest leftward panel component 73. As the pusher blocks 72 continue to push rightwardly, the panel components are compressed together, with the furthest right component abutting the spacer block 51, which in turn abuts the structural member 74 of the frame 11. Next, the pressure in the air bags 24 is slackened off slightly, in order to remove completely any restraint on the lateral movement of the components that might have been exerted by the vertical pinching pressure of the platens 12 and 13. The air pressure in the air bags 24 must not, however, be slackened off to the point where the panel components 38 fall downwardly away from the upper platen 12. Following the slackening-off step, during which the panel components 38 assume their tightest, most compressed configuration under the urging of the pusher blocks 72, the air pressure in the air bags 24 is again increased so as to firmly grip and compress the panel components 38 vertically between the platens 12 and 13. At this point the electrical apparatus associated with the upper platen 12 is energized to set up a high freqeuncy electrical field between the two platens, thereby heating and curing the plastic resin, as aforesaid. Next, the lateral pressure is released by exhausting the air from the tube 71, following which the vertical pressure is released by exhausting the air from the air bags 24. This last exhaustion permits the lower platen 13 to drop back down to its loading position wherein it is aligned with the opening 36 and the lay-up table 35.

The means by which the finished, glued panel is cleared from between the platens 12 and 13 is shown in FIGURES 1 and 2. Its main component is an arm member 77 which is shown completely in FIGURE 2 but is partly broken away in FIGURE 1. In the embodiment shown, the arm means 77 is depicted as a tapering plate or bar, but it can have any configuration that will function properly. At the thick end of the taper, the arm means 77 has secured thereto a bracket 78 which extends through a horizontally elongated slot 79 between the elongated horizontally extending structural members 56 and 57. Referring to FIGURE 2, a cylindrical rod shown in cross-section at 80 is fixed horizontally to the frame 11. Mounted to slide longitudinally of the rod 80 is a cylindrical runner 81, to which one end of the bracket 78 is welded. At the other end of the arm member 77 is a castor or wheel 82 which merely runs freely over the surface of the lower platen 13. An endless chain (not shown) is trained over two sprockets (not shown) one at either end of the structural member 56. These sprockets are thus located near the ends of the rod 80. One of the sprockets is mounted on the structure member 56 for free rotation. The other is secured to the shaft of a two-way reversible motor (not shown). The runner 81 has an eye 86 secured thereto, which is attached to a link in one of the runs of the endless chain. Consequently, when the reversible motor rotates in one direction, the arm member 77 is made to sweep towards the viewer looking at FIGURE 2, and when the motor rotates in the other direction, the arm member 77 moves in the opposite direction. Two limit switches are provided on the opposite faces of the arm member 77 at the left-hand end thereof in FIGURE 1. One of the limit switches 87 can be seen in FIGURE 1, and is wired such that when it contacts a trigger tab 89, it reverses and shuts off the reversible motor. The second limit switch (not visible), mounted on the opposite face of the arm member 77, is adapted to contact a second trigger tab 89 (see FIG. 2) at the other end of the sweep of the arm member 77, and reverses the reversible motor when it does so. It will thus be clear that the resting position of the arm member 77 is its position shown in FIGURE 1. This resting position is clear of the displacement paths of both of the platens 12 and 13.

As soon as the pressing and gluing operation of a wood panel is completed, and the lower platen 13 has dropped back down to its loading position, the reversible motor is energized and the arm member 77 sweeps through and back to clear the finished panel out from between the platens and onto a clearing table 90 located at the rear of the press 10 as seen in FIGURE 1. From the clearing table 90, the finished wood panels can be removed manually, or by some appropriate automatic means.

The above description has assumed that the press 10 is being used for "side-loading," wherein the wood panel components 38 are introduced transversely or "sideways" into the inter-platen space from the lay-up table 35. A unique feature of the panel press shown in the drawings is that it is readily convertible to an "end-loading" arrangement, wherein the wood panel components, usually considerably longer than those used in side-loading, are introduced longitudinally between the platens 12 and 13 in the direction from the arm member 77 to the clearing table 90, i.e. in a direction perpendicular to the side-loading introduction direction. As described at the beginning of this disclosure, in the prior are presses the conversion to end-loading was a difficult matter due to the fact that the arm member completely blocked the inter-platen space, and prevented passage therethrough of panel components in the longitudinal direction. In the present invention, the fact that the lower platen 13 is not immobilized as in the prior art presents a ready solution to this problem. Specifically, this invention provides jack means for insertion between the frame 11 and the structure supporting the lower platen 13 to raise the latter so that its lowermost resting position or "loading" position is one where it clears the arm member 77. The jack means utilized in this embodiment of the invention is best seen in FIGURES 7 and 8. A shaft 91 is journaled for free rotation through apertures 92 in the vertical structural member 21 of the frame 11 and through apertures 93 provided in structural member 94 (FIGURE 1). Another shaft 95 parallel to the shaft 91 is provided in an analogous position at the rear end of the press and can be seen in FIGURE 2. One end of each shaft extends beyond the structural members of the frame and is bent into a crank 96 for manual rotation, as shown in FIGURE 2. To each of the shafts 91 and 95, at points adjacent the air bags 24, are welded L-shaped brackets 97 which rotate with the shaft. Welded to each bracket 97 is a cylindrical jack member 98 adapted, as shown in FIGURE 8, to swing upwardly and position itself squarely between the plate 26 and the member 25 of the structure 19. The jack members 98 will fit into this position, however, only when the structure 19 has first been raised by the air bags 24. The jack members 98 can, for example, be made of short lengths of piping. The vertical dimension of the jack members 98 is sufficient to raise the lower platen 13 clear of the arm member 77, so that elongated wooden panel components can be fed longitudinally into the inter-platen space without being impeded by the arm member 77.

When the jack members 98 are in position, the lower platen 13 will still be below (approx. ½″) the top edge of the structural member 57, so that when the air bags 24 are distended by air pressure, the lower platen 13 will have some travel remaining before it reaches the position shown in FIGURE 6, wherein it is just slightly (approx. ⅛″) below the top edge of the structural member 57.

Thus, when the press according to this invention is used for end-loading, the same sequence of vertical and transverse compression operations can be carried out as was carried out for side loading.

While a preferred embodiment of this invention has been disclosed herein, those skilled in the art will appreciate that changes and modifications may be made therein without departing from the spirit and scope of this invention as defined in the appended claims.

What we claim in our invention is:

1. A press for laterally compressing together elongated panel components, the press comprising:
   a frame, a generally horizontal upper platen mounted on the frame and capable of being adjusted to and fixed at different vertical locations with respect to the frame, a lower platen parallel with the upper platen and vertically movable upwardly toward and downwardly away from the upper platen, feed means adapted to introduce panel components between said platens along a substantially horizontal plane which is fixed with respect to the frame, the lower platen being adapted to rest, during the introduction of panel components between the platens, at a vertical location wherein it is substantially aligned with said plane, in which condition the platens are open.

first means for selectively exerting an upward force upon the lower platen for selectively displacing the latter from said vertical location upwardly toward the upper platen to close the platens, thereby vertically to compress between the platens panel components introduced therebetween, and second means for selectively horizontally compressing together panel components that are between the closed platens.

2. A press as claimed in claim 1, the press being adapted for side-loading operation wherein elongated panel components aligned in side-by-side relation and having adhesive material along the inter-component edges are introduced from said feed means tranversely in one direction between the open platens, the second means being adapted to compress the elongated panel components transversely together, the panel components during the last-mentioned compression being adhered together to form a panel.

3. A press as claimed in claim 2, the press being provided with selectively displaceable arm means adapted to pass between the open platens in a second direction substantially perpendicular to said one direction in order to remove formed panels from between the platens.

4. A press as claimed in claim 3, in which the arm means moves with substantially rectilinear translation along a line fixed with respect to the frame and remains exteriorly adjacent the platens during activation of said first means, so as effectively to impede the free passage of panel components in said second direction between the open platens, and jack means adapted for insertion between the frame and the lower platen to raise the latter to a location where it clears the arm means, from which last-mentioned location the first means is adapted to displace the lower platen upwardly toward the upper platen, thereby to provide for end-loading operation of the press wherein elongated panel components aligned in side-by-side relation and having adhesive material along the inter-component edges are introduced longitudinally in said second direction between the platens.

5. A press as claimed in claim 2, in which the adhesive material incorporates an uncured plastic resin, and in which third means are provided for curing the plastic resin and thereby adhering the panel components together during the horizontal compression of the panel components by said second means, said third means comprising electrical apparatus in at least one of the platens for generating heat in adjacent plastic resin through the concentration therein of an electric field.

6. A press as claimed in claim 4, in which the frame includes structural members subjacent to the lower platen, and in which the jack means includes a plurality of jack members adapted to be swung into a position beneath the lower platen in which they rest on said subjacent structural members.

7. A press as claimed in claim 6, in which each jack member is a rigid cylinder and is attached to one end of an arm which is pivoted at its other end about an axis fixed with respect to the frame.

8. A press as claimed in claim 7, in which there are four jack members, of which the respective arm members are secured in pairs to two horizontal, rotatable shafts running beneath opposite edges of the lower platen, each horizontal shaft having a manual crank at one end.

9. A press as claimed in claim 1, in which said first means comprises a plurality of spaced, axially extensible air bags supported from said frame and bearing upwardly against said lower platen, the air bags being fed from a common source of air under pressure, the press further comprising, adjacent each air bag, a balancing mechanism incorporating spring means adapted to bear downwardly on the lower platen at a point adjacent the respective air bag with a force that increases substantially linearly with displacement, thereby to insure that the lower platen will rise evenly under the pressure of the air bags.

References Cited

UNITED STATES PATENTS

| | | | |
|---|---|---|---|
| 2,307,344 | 1/1943 | Zottu | 156—380 |
| 2,453,185 | 11/1948 | Bilhuber | 156—380 |
| 2,472,708 | 6/1949 | Jones | 219—10.53 |
| 2,544,133 | 3/1951 | Carlson | 156—304 X |
| 2,646,105 | 7/1953 | Langer | 100—93 |
| 2,708,649 | 5/1955 | Cunningham | 156—272 X |
| 3,021,248 | 2/1962 | Mann et al. | 156—274 |
| 3,126,308 | 3/1964 | Brockerman et al. | 156—274 X |
| 3,232,811 | 2/1966 | Coulter et al. | 219—10.53 X |
| 3,366,037 | 1/1968 | Drake | 100—93 |
| 2,790,483 | 4/1957 | Ederer et al. | 156—272 |

HAROLD ANSHER, Primary Examiner.

U.S. Cl. X.R.

100—93; 156—273, 304, 583; 219—10.53, 148